June 28, 1966   J. D. PFEIFFER   3,258,594
MULTIPLE SHEET DETECTOR SYSTEM
Filed July 5, 1963   5 Sheets-Sheet 1
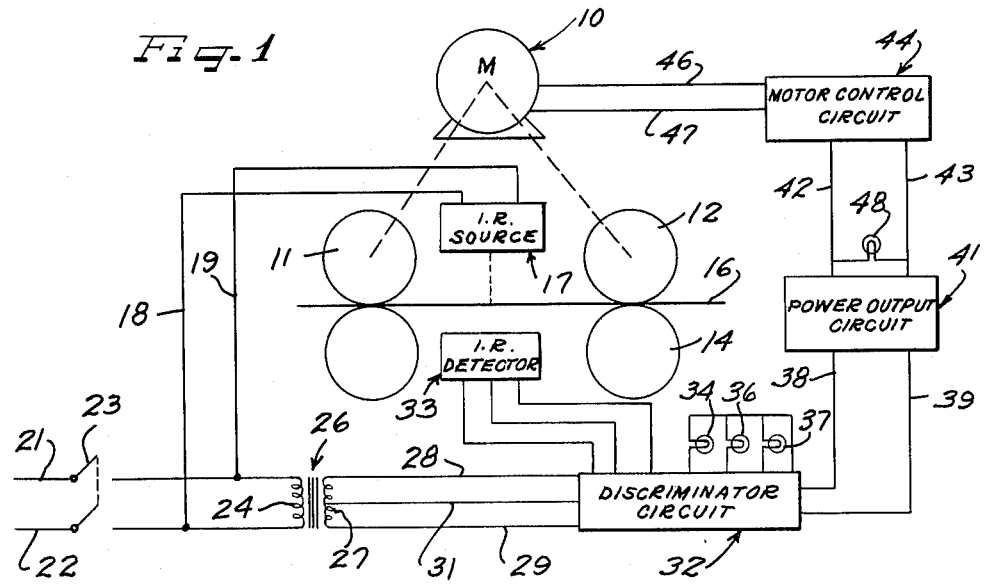
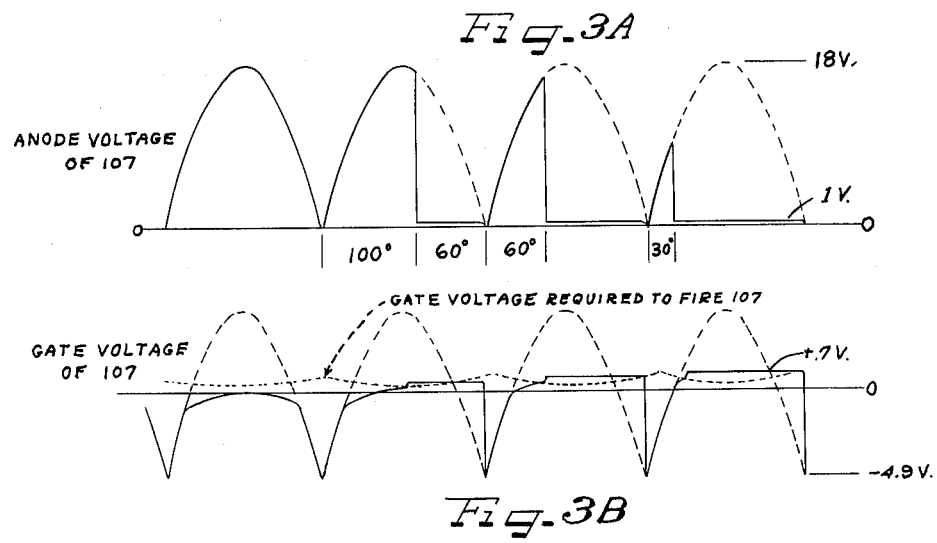
INVENTOR.
J. David Pfeiffer
BY
ATTORNEYS

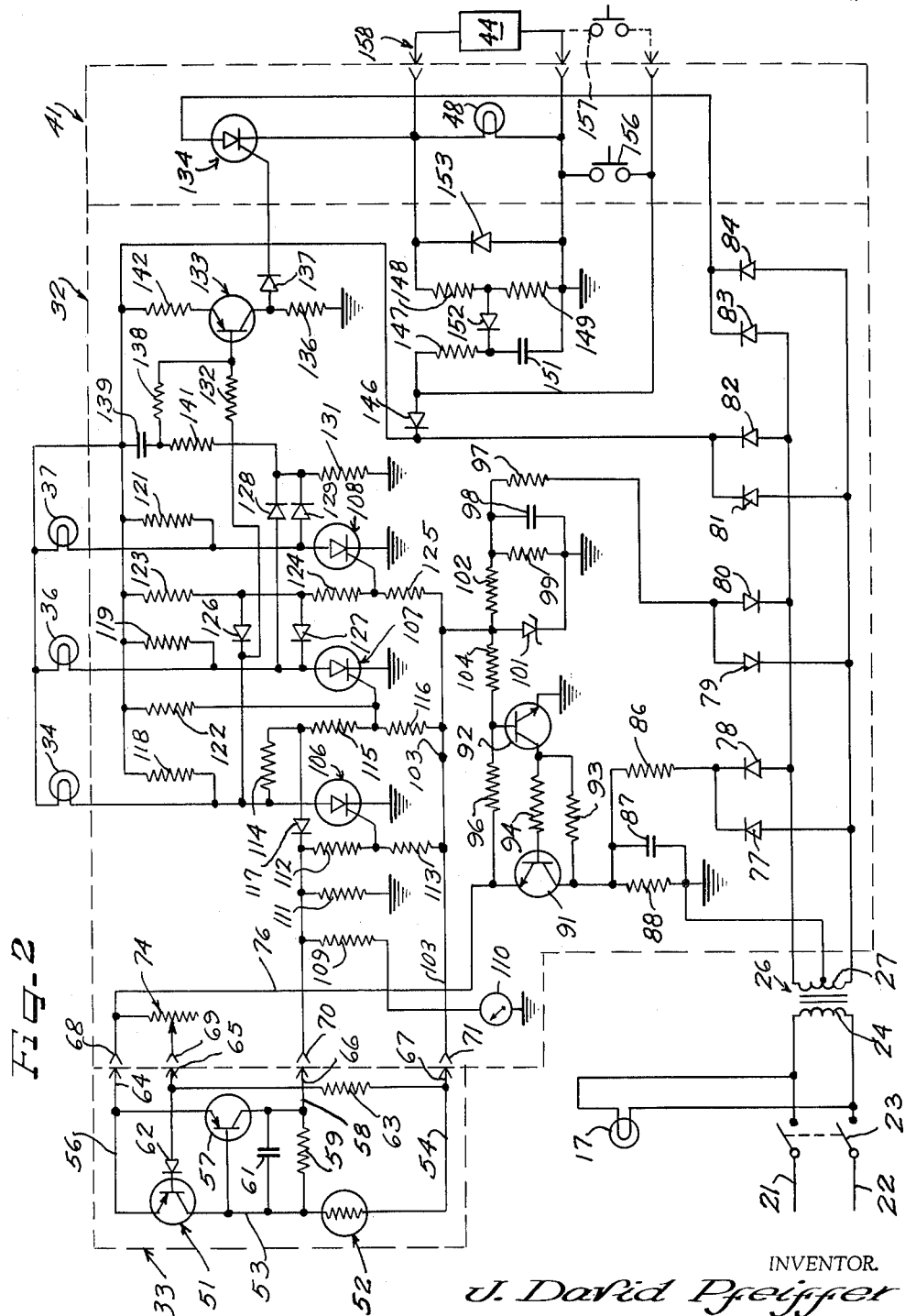

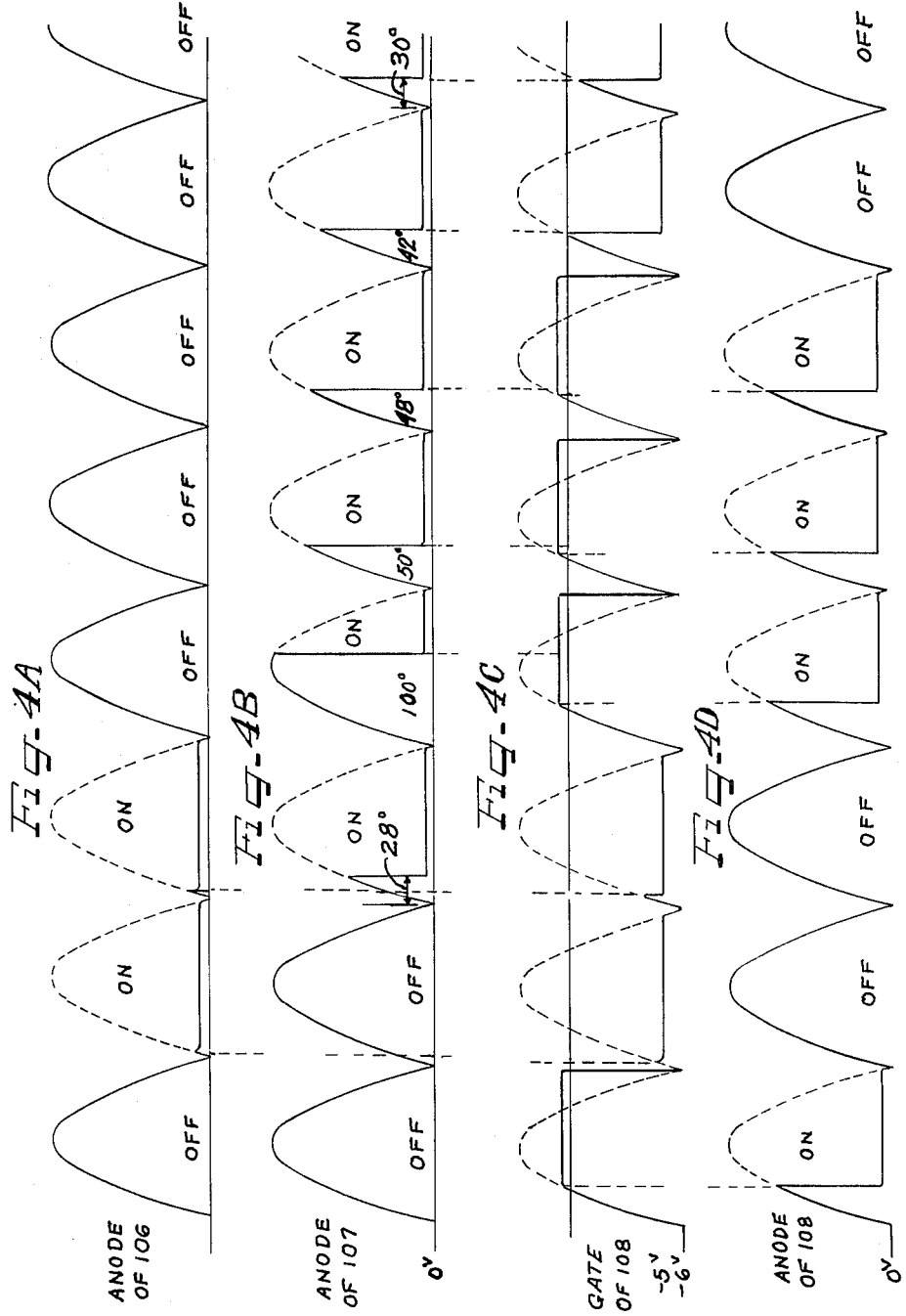

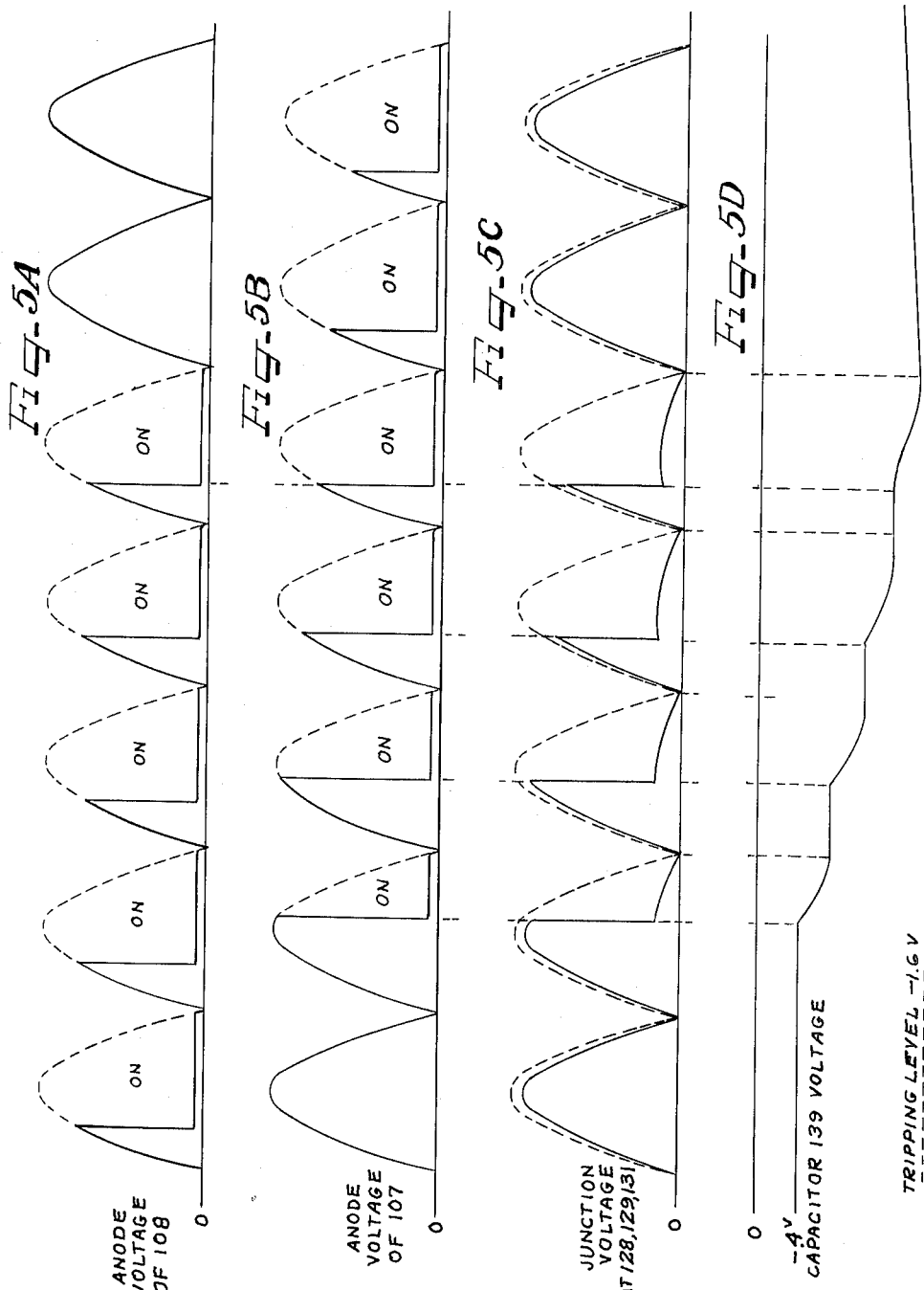

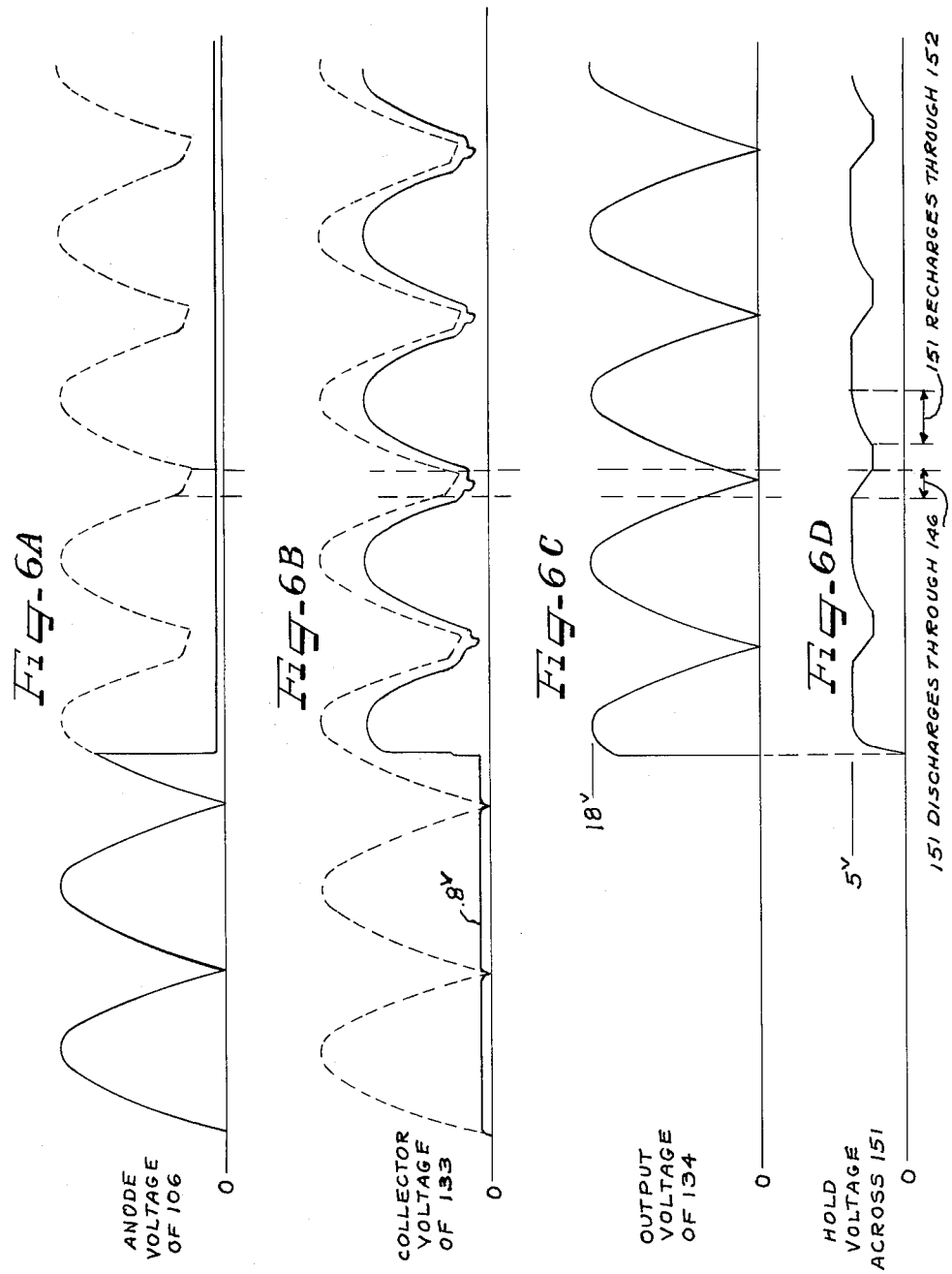

United States Patent Office 3,258,594
Patented June 28, 1966

3,258,594
MULTIPLE SHEET DETECTOR SYSTEM
John David Pfeiffer, 517C Lionville Road,
Downingtown, Pa.
Filed July 5, 1963, Ser. No. 292,884
8 Claims. (Cl. 250—83.3)

This invention relates to a multiple sheet detector system and was evolved with the general object of providing a system for measuring the number of sheets of paper, plastic or like material fed from one point to another in a printing press or other sheet-handling apparatus, and more particularly for taking corrective action in the event of the feed of an excessive number of sheets. The system of this invention attains such results in a highly reliable and efficient manner while using a minimum number of component parts. The system can be readily applied to existing machines, or incorporated in new machines, and it is highly versatile in operation. It will be understood that various features of the invention have other applications.

In the system of this invention, radiant energy is transmitted from a source to a detector through sheet material to determine the thickness thereof, or the number of sheets of a given thickness therein. An important feature is in the use of infrared light as the radiant energy, to obtain a highly sensitive and accurate measurement of thickness, with a high degree of reliability and with minimum interference due to ambient lighting conditions.

Another important feature relates to the construction of the detector, in which a phototransistor is directly coupled to an amplifying transistor to obtain a D.C. output signal, and in which means are provided for compensating for variations in ambient temperature conditions.

Further important features of the invention relate to the provision of discriminator means responsive to the output signal from the detector circuit for reliably providing an output signal only under certain conditions, such as the existence of more than one sheet between the source and detector. Preferably, the discriminator means is operative to discriminate absolutely among conditions wherein no sheet is present, one sheet is present, and two or more sheets are present.

Another important feature is in the automatic control of feeding means from the output of the discriminator circuit.

Still another feature of the invention is in the provision of means whereby the system may be readily adjusted to handle various thicknesses and types of sheet materials, and to perform desired control functions.

This invention contemplates other and more specific objects, features and advantages which will become more fully apparent from the following detailed description taken in conjunction with the accompanying drawings which illustrate a preferred embodiment and in which:

FIGURE 1 diagrammatically illustrates a multiple-sheet detector system constructed according to the principles of this invention and applied to a sheet-material handling system;

FIGURE 2 is a schematic circuit diagram of the detector system of FIGURE 1;

FIGURES 3A and 3B, FIGURES 4A–4D, FIGURES 5A–5D and FIGURES 6A–6D illustrate diagrammatically the waveforms at various points of the circuit of FIGURE 2, under various conditions of operation, for clarifying the manner of operation of the circuit.

A complete multiple sheet detector system has been illustrated rather schematically in FIGURE 1 of the drawings. In that figure, reference numeral 10 indicates generally a prime mover such as a motor which is mechanically coupled to a pair of spaced rollers 11 and 12. Rollers 13 and 14 cooperate with the rollers 11 and 12, respectively, to drive a web 16, the web consisting of paper, plastic, or other sheet type material.

A source of infrared radiation has been designated at numeral 17 in the drawings, the source 17 being arranged to direct the infrared radiation at the web 16 passing between the sets of rollers. The infrared source is energized by means of a pair of conductors 18 and 19 from a suitable source of line voltage appearing across lines 21 and 22. A double pole, single throw switch 23 controls the application of line voltage to the circuit.

Line voltage is also applied across a primary 24 of a power transformer 26 having a secondary 27 energizing the remainder of the electrical circuits involved. Specifically, a pair of conductors 28 and 29 and a center tapping conductor 31 apply the voltages appearing across the secondary 27 to a discriminator circuit 32. Control signals are fed to the discriminator circuit 32 from an infrared detector 33 positioned on the side of the web 16 opposite from the infrared source 17. The discriminator circuit 32, among other things, controls the operation of a series of indicator lamps 34, 36 and 37 in a manner to be described in a succeeding portion of this specification. A control signal developed in the discriminator circuit 32 may also pass by means of conductors 38 and 39 into a power output circuit generally indicated at numeral 41 of the drawings. A pair of conductors 42 and 43 deliver the output of the power output circuit 41 to a motor control circuit 44 connected to the motor 10 by means of conductors 46 and 47. A warning lamp 48 is connected across the conductors 42 and 43 to provide a warning of a "stop" condition, as will be apparent from the more specific description which follows.

The particular circuits identified by block diagrams in FIGURE 1 have been identified with the same reference numerals in the more complete circuit diagram of FIGURE 2. The detector 33 employs a sensor consisting of a phototransistor 51 which is sensitive to infrared radiation to vary its current transmitting characteristics. The collector of the phototransistor 51 is connected to a temperature compensating element such as a thermistor 52 by means of a conductor 53. The other end of the thermistor 52 is connected to a source of negative voltage through a conductor 54.

The emitter of the phototransistor 51 is connected by means of a conductor 56 to the emitter of a PNP type amplifying transistor 57 having its base connected to the conductor 53. Transistor 57 has its collector connected to a conductor 58, and a resistor 59 and a capacitor 61 connected between the conductor 58 and the conductor 53.

The base of the phototransistor 51 is connected to a diode 62 which, in turn, is connected to the source of negative potential represented by the conductor 54 through a resistor 63.

Physically, the phototransistor 51, the amplifier transistor 57, the diode 62, capacitor 61, and thermistor 52 can all be located in a housing which is filled with a potting material such as an aluminum filled epoxy resin, the filler being sufficiently thermally conductive so that the elements named can achieve thermal equilibrium with each other.

The operation of the detector circuit 33 is described in detail hereinafter. In brief, it functions to develop a voltage at the output conductor 58 which varies with the intensity of the infrared radiation on the phototransistor 51 and thereby with the web thickness or number of sheets.

Electrical connections between the infrared detector 33 and the discriminator circuit 32 is made by means of a four prong plug having pins 64 to 67 inclusive which are electrically arranged to engage a jack in the discriminator circuit having sockets 68, 69, 70 and 71.

Typical circuit elements for the detector circuit 33 are listed in the following table:

| | |
|---|---|
| Phototransistor 51 | Type 2N469A. |
| Thermistor 52 | Type 51A11. |
| Diode 62 | Type 1N270. |
| Transistor 57 | Type 2N527. |
| Resistance 59 | 100,000 ohms. |
| Resistance 63 | 1.5 megohms. |
| Capacitor 61 | 0.1 mf. |

A sensitivity control for the detector circuit is provided by a potentiometer 74 which applies an adjustable bias to the elements in the detector circuit from a regulated low voltage power supply through a conductor 76. Typically, the voltage from this supply is a positive ten volts.

The power supply embodied in the discriminator circuit 32 includes a series of diodes 77 to 84 inclusive connected across the secondary 27 of the transformer 26. A positive, full wave rectified voltage is applied across an RC network consisting of a resistor 86, a capacitor 87 and a resistor 88. Voltage regulation for the positive supply is provided by a pair of NPN type transistors 91 and 92 and a series of resistors 93, 94 and 96 connected between the transistors 91 and 92 as shown.

A regulated negative bias voltage is provided by taking a fully rectified negative voltage from the diodes 79 and 80 and applying it across an RC network consisting of a resistor 97, a capacitor 98 and a resistor 99, with a Zener diode 101 connected in series with a resistor 102 across the resistor 99 to develop a regulated negative voltage, preferably minus 10 volts, on a conductor 103 which is connected through the jack and plug contacts 71 and 67 to the conductor 54. This negative voltage is also applied through a resistor 104 to the base of the voltage-regulating transistor 92.

The output of the detector circuit 33 at jack contact 70 is fed to a series of silicon controlled rectifiers 106, 107 and 108. In particular contact 70 is connected through a resistor 109 and a milliammeter 110 to ground, through a resistor 111 to ground, and through resistors 112 and 113 to the conductor 103, the junction between resistors 112 and 113 being connected to the gate of the rectifier 106.

The anode of the silicon controlled rectifier 107 is connected through resistors 114-116 to the conductor 103, the junction between resistors 114 and 115 being connected through a diode 117 to the jack contact 70 and the junction between resistors 115 and 116 being connected to the gate of the rectifier 107.

The principal function of the three silicon controlled rectifiers 106, 107 and 108 is to light the three indicator lamps 34, 35 and 37. Resistors 118, 119 and 121 are connected across each lamp to supply operating current to the rectifiers 106, 107 and 108 if any lamp should burn out. A resistor 122 connects a source of full wave rectified non-filtered pulses to the gate of rectifier 107 to provide a full wave ripple voltage which assists in phase controlling the firing angle of rectifier 107.

The gating signal to rectifier 108 is provided through a voltage divider network consisting of a series of resistors 123, 124 and 125. Clamping diodes 126 and 127 are provided in the circuits of rectifiers 106 and 107 respectively.

A pair of diodes 128 and 129, together with resistors 131 and 132 provide a logical control circuit, the diodes 128 and 129 being connected to the anodes of rectifiers 107 and 108 respectively. The resistor 132 is connected to the base input of a transistor 133 which drives an output silicon controlled rectifier 134 in the power output circuit 41. The collector current of transistor 133 flows through a resistor 136 and through a diode 137 into the gate of rectifier 134 to cause it to conduct.

Another path for the base current of the transistor 133 is provided by a resistance 138 and a capacitor 139. The capacitor 139 is tied to the junction of diodes 128 and 129 by means of a resistor 141. The emitter of transistor 133 is tied to the full wave rectified source by means of a resistor 142.

The fully rectified output from the rectifiers 81 and 82 is also impressed on a hold voltage circuit consisting of a diode 146, resistors 147, 148 and 149, a capacitor 151 and a diode 152. A diode 153 is connected in reverse direction across the load, and conducts only when an inductive load is present, thereby preventing damage to the output silicon controlled rectifier 134. A manual reset switch 156 is provided to discharge the capacitor 151 through the resistor 147. This reset button 156 may be paralleled by an external reset switch 157 associated with the load 44 which may consist of a solenoid or a relay which controls the operation of the motor 10. The motor control circuit 44 is coupled to the power output circuit 41 by means of a pin and jack connector generally illustrated at numeral 158.

As a typical example of circuit parameters which can be used in the discriminator and power output circuits, assuming a secondary voltage at the secondary 27 of 12.6 volts A.C., reference may be had to the following table:

| | |
|---|---|
| Potentiometer 74 | 5,000 ohms. |
| Diodes 77–84 | Type 1N3640. |
| Resistor 86 | 10 ohms. |
| Capacitor 87 | 100 mf. |
| Resistor 88 | 1,000 ohms. |
| Transistors 91, 92 | Type 2N1304. |
| Resistor 93 | 10,000 ohms. |
| Resistor 94 | 1,000 ohms. |
| Resistor 96 | 22,000 ohms. |
| Resistor 97 | 68 ohms. |
| Capacitor 98 | 100 mf. |
| Resistor 99 | 1,000 ohms. |
| Diode 101 | Type 1N1771. |
| Resistor 102 | 22 ohms. |
| Resistor 104 | 22,000 ohms. |
| Silicon controlled rectifiers 106, 107, 108 | Type 2N2344. |
| Resistor 109 | 8,200 ohms. |
| Resistor 111 | 4,700 ohms. |
| Resistor 112 | 24,000 ohms. |
| Resistor 113 | 39,000 ohms. |
| Resistor 114 | 56,000 ohms. |
| Resistor 115 | 33,000 ohms. |
| Resistor 116 | 68,000 ohms. |
| Diode 117 | Type 1N482. |
| Resistors 118, 119, 121 | 470 ohms. |
| Resistor 122 | 240,000 ohms. |
| Resistor 123 | 10,000 ohms. |
| Resistor 124 | 47,000 ohms. |
| Resistor 125 | 39,000 ohms. |
| Diodes 126, 127, 128, 129 | Type 1N482. |
| Resistor 131 | 1,000 ohms. |
| Resistor 132 | 10,000 ohms. |
| Transistor 133 | Type 2N1415. |
| Silicon Controlled rectifier 134 | Type C15U. |
| Resistor 136 | 1,000 ohms. |
| Diode 137 | Type 1N482. |
| Resistor 138 | 1,000 ohms. |
| Capacitor 139 | 25 mf. |
| Resistor 141 | 5,600 ohms. |
| Resistor 142 | 100 ohms. |
| Diode 146 | Type 1N3640. |
| Resistor 147 | 10 ohms. |
| Resistor 148 | 220 ohms. |
| Resistor 149 | 100 ohms. |
| Capacitor 151 | 25 mf. |
| Diodes 152, 153 | Type 1N3640. |

OPERATION

The operation will be described with reference to particular voltage values and waveforms at various points of the circuits, produced with component values and applied voltages as indicated above, it being understood that such values are set forth by way of illustrative example, and not by way of limitation.

In operation, the sensitivity control 74 is adjusted depending upon the characteristics of the sheet material being examined. For a material such as index paper stock, the sensitivity control is set at or near one end of the scale, while for very thin papers such as onionskin paper, it is set at or near the opposite end of the scale.

Phototransistor 51 acts as a light controlled shunt on the amplifier transistor 57. High values of infrared light falling on the phototransistor 51 will cause it to conduct, shunting any base current away from transistor 57 and therefore reducing the collector current of transistor 57 almost to zero, so that substantially no amplifier output voltage occurs. Removing the light from the phototransistor 51 renders it non-conducting and current flowing through the thermistor 52 from the minus ten volt bus 54 flows into the base of the transistor 57, driving it into saturation with about a 0.1 volt saturation drop, providing a 9.9 volt amplifier output voltage. Very little current flows through the negative feedback resistor 59 in this condition because the base of transistor 57 and the collector are at substantially the same potential.

Phototransistor 51 and a transistor 57 act as direct coupled D.C. amplifiers. The phototransistor 51 is also sensitive to ambient temperature, as is transistor 57, but in the opposite sense. However, the transistor 57 amplifies the temperature variation from the phototransistor 51 so that some element of temperature compensation is necessary. The thermistor 52 provides a temperature compensation since it has a negative temperature coefficient matched to the requirements of the circuit. At higher temperatures where phototransistor 51 is rendered more conductive by the ambient temperature, thermistor 52 has a lower resistance and supplies more current. Thus, the thermistor 52 varies to match the effective resistance of the phototransistor 51 and thereby supplies approximately the same current to the base of the amplifier transistor 57 as temperature varies.

The diode 62 acts to stabilize temperature drifts caused by the tendency of the base-emitter voltage of phototransistor 51 to become lower with increasing temperature. It should be noted that the diode 62 is connected in a manner such that the current flows into the base of the phototransistor 51 instead of out. The current is supplied from the positive ten volt supply through the sensitivity control 74 and the diode 62 into the base of the phototransistor 51. As the temperature of the phototransistor 51 increases and the emitter-base voltage decreases, there is a tendency thereby for the phototransistor 51 to draw less base current. In this reversed current direction, the effect is the same as if the illumination were increased. Diode 62 has the necessary decrease of forward resistance with temperature to present a reduced circuit resistance to the base at a higher temperature to offset the effect of lowered base-emitter voltages at phototransistor 51.

Variation of the sensitivity control 74 changes the slope of the sensor characteristic curves and determines the range of light values in which the sensor is to operate. To provide a more rapid decrease in the base current when the sensitivity control 74 is near one end of the scale, the resistor 63 has been included to provide an increasing bias in the negative direction as the sensitivity control 74 is rotated. The amount of bias with the sensitivity control 74 at one end of the scale is not sufficient to stop the forward current flow through the diode 62.

Capacitor 61 and resistance 59 act as inverse feedback elements between the base and collector of transistor 57. Capacitor 61 operates on alternating current or rapidly changing signals to smooth the amplifier output and remove undesirable noise and transients. Resistor 59 affects the static or slowly changing output levels of the amplifier transistor 57. A voltage change appearing at the collector of transistor 57 is coupled back to the base in the same polarity but reduced amplitude by the resistor 59. This signal on the base tends to reduce the excursion of voltage on the collector. The resultant reduction in effective gain of the amplifier transistor 57 also tends to make the output more linear so that the output current through the resistor 111 becomes a more faithful replica of the base current into the transistor 57 as long as the latter is not saturated or cut off.

Turning now to the discriminator circuit 32, the three silicon controlled rectifiers 106, 107 and 108 supply sufficient current to light the indicator lamps 34, 36 and 37, but are sensitive enough to require only microwatts of power at the gate connections to turn them on. The silicon controlled rectifiers are turned off by operating them from a common power source, specifically a 12.6 volt r.m.s., unfiltered, full wave rectified alternating current. With a 60 cycle frequency, this voltage returns to zero every 8 and ⅓ milliseconds and cuts off every silicon controlled rectifier by effectively turning off the power. A holding circuit, however, embodying the diode 146 is employed to keep any of the silicon controlled rectifiers in conduction which were conducting when an out of limit condition appeared. The operation of this circuit will be described in more detail subsequently.

Signals taken from the anodes of silicon controlled rectifiers 106, 107 and 108 through the resistor 132 and diodes 128 and 129 are combined to produce a corrective action known as a stop condition in which the high current silicon controlled rectifier 134 is turned on.

With the specific circuit described previously, only the silicon controlled rectifier 108 is fired for amplifier output voltages between zero and 1.6 volts, thereby lighting the indicator light 37. This condition will be referred to as condition "A." Both silicon controlled rectifiers 108 and 107 are fired (although rectifier 107 is fired for only part of a cycle) thereby lighting indicator lamps 36 and 37 when the amplifier output voltage is in the range from about 1.6 volts to 2.7 volts, a condition which will be referred to as condition "B." Only silicon controlled rectifier 107 is fired for amplifier voltages between 2.7 and 6.8 volts, lighting only indicator lamp 36, a condition which will be referred to as condition "C." Only silicon controlled rectifier 106 is fired for amplifier voltages between 6.8 volts and 9.9 volts, lighting only indicator lamp 34, a condition which will be referred to as condition "D." The signals from the three silicon controlled rectifiers are processed such that the stop condition is produced when either condition "D" is obtained or when condition "B" is maintained for longer than 35 milliseconds. Conditions "A" and "C" are normal and do not activate the stop condition.

The silicon controlled rectifier 106 is connected directly to the amplifier output by the voltage divider consisting of resistors 112 and 113 and fires unconditionally if the amplifier output rises to a high enough value, specifically to 6.8 volts in the particular circuit under consideration. Rectifier 107 is conected to the amplifier output through the diode 117 and voltage divider 115 and 116 in such a manner that its firing is conditioned on rectifier 106 being non-conducting. The voltage divider is arranged so that rectifier 107 turns on at 1.6 volts, before rectifier 106 fires. When a higher amplifier output turns on rectifier 106, the condition is established to remove the signal to rectifier 107. The conditional signal to turn on rectifier 108 is derived from the outputs of the preceding rectifiers, 106 and 107, and not directly from the amplifier output. Diodes 126 and 127 operate in conjunction with voltage dividers 124 and 125 such that if either rectifier 106 or 107 or both are delivering low anode voltage, indicating conduction of the rectifiers, the gate bias on rectifier 108 is low, leaving it turned off. However, if rectifier 106 is off and rectifier 107 is firing late enough in the cycle (past about 45° in a 180° cycle of one full wave crest) rectifier 108 will fire before rectifier 107 does and both rectifiers 107 and 108 will be conducting as in condition "B."

When the amplifier output voltage is zero, the voltage divider consisting of resistors 112 and 113 applies approximately minus 4 volts to the gate of rectifier 106 from the negative ten volt bus, biasing the rectifier 106 out of conduction. As the amplifier output rises, the gate voltage rises proportionately until it reaches about +0.5 volt, corresponding to about 6.8 volts amplifier output at this point, the rectifier 106 will fire. Since the voltage on the gate is essentially direct current, the firing of rectifier 106 starts at an early point in the cycle of anode voltage and very little additional change in firing angle occurs from raising the amplifier voltage higher than 6.8 volts.

The voltage divider which supplies the gate signal to rectifier 107 is driven from the junction of resistor 114 and diode 117. These two components form a gate circuit which delivers to the top of the resistor 115 a voltage which is essentially the lesser of either the amplifier output or the anode voltage of rectifier 106. If rectifier 106 is fully conducting, its anode voltage will be approximately 1 volt and the diode 117 will draw no forward current. With 1 volt appearing at the anode of rectifier 106, the voltage at the gate of rectifier 107 is determined by the currents flowing through resistor 114 and 115, returning to a negative 10 volts through resistor 116, and also by the current flowing through resistor 122. The current through the latter is greatest when the full wave rectified source reaches its maximum, i.e., about 18 volts. At this point the maximum gate voltage on rectifier 107 is a negative 2 volts, insufficient to turn on that rectifier.

If rectifier 106 is off, the voltage at the junction of resistor 114 and diode 117 is prevented from rising above the amplifier output voltage by the clamping action of the diode 117. The forward conduction current for this diode is supplied through the resistor 114 so that the anode voltage of rectifier 106 must be higher than the amplifier output voltage to cause diode 117 to conduct. Thus, when the anode voltage is high during the crest of the full wave rectified voltage, resistor 115 is supplied with amplifier output. In the intervals between the crests, the divider input falls below the amplifier output voltage with a waveform which is a replica of this portion of the fully rectified wave. Resistor 122 injects to the gate of rectifier 107 a full wave ripple voltage of about 2 volts peak to peak to aid in controlling the phase of the firing angle of rectifier 107.

FIGURES 3A and 3B illustrates the anode and gate voltages on rectifier 107 under four conditions of amplifier output. In the first portion of the curve, the amplifier output is assumed to be 1.4 volts, insufficient to fire the rectifier 107. The anode voltage is then a fully rectified sine wave. In the second portion of the curve, the amplifier output is taken to be 1.6 volts so that the rectifier 107 is triggered into conduction. This occurs after the crest of the half wave voltage due to the integrating action of the capacitor 61 in the amplifier circuit which tends to reduce transient disturbances on the amplifier output line. The disturbances come from ripple voltages from the fully rectified source carried through resistor 114 and diode 117 and through resistor 122 and 115 feeding back into the amplifier output. Capacitor 61 smooths these disturbances and in doing so shifts their phase.

When the amplifier output is increased to 2 volts, as appears in the third portion of the curves, diode 117 conducts later in the cycle with the result that rectifier 107 fires at a phase angle of about 60°. When the voltage is increased to 3.5 volts on the amplifier, a condition shown in the fourth portion of the curves, the rectifier 107 fires at an angle of about 30°. When the amplifier output is increased beyond 3.5 volts, a limiting value of about 28° is reached, and the rectifier 107 cannot fire earlier than at this angle.

The gate signal to rectifier 108 is supplied through the voltage divider consisting of resistances 123, 124 and 125. If neither of the diodes 126 and 127 is drawing any forward current, as occurs when rectifiers 106 and 107 are both off, the gate voltage begins at a negative 6 volts at the minimum points of the fully rectified energizing voltage, and rises toward a positive 3 volts at the crest of the voltage. When this voltage crosses the gate firing potential, at about 45°, rectifier 108 fires. If either rectifier 106 or 107 fires before 45°, its 1 volt anode voltage will cause forward current to flow in diodes 126 or 127, immediately clamping the gate voltage of rectifier 108 to a negative 5 volt level before rectifier 108 can fire. The various combinations are illustrated in FIGURE 4 of the drawings in which FIGURE 4A represents the anode voltage at rectifier 106, FIGURE 4B represents the anode voltage at rectifier 107, FIGURE 4C represents the gate voltage at rectifier 108, and FIGURE 4D represents the anode voltage at rectifier 108.

The logical combining is done by resistor 132 and diodes 128 and 129 connected to the anodes of rectifier 107 and 108 respectively. When rectifier 106 is conducting, sufficient current flows from the base of transistor 133 to the 1 volt anode of rectifier 106 through resistor 132 to bias transistor 133 into conduction. The resulting collector current flows through resistor 136 and through diode 137 into the base of transistor 134, turning it on. Thus, a stop condition exists whenever indicator light 34 is on.

The second path for the base current of transistor 133 is through resistor 138 connected to capacitor 139. Normally, the voltage at the junction of these two elements is about 0.4 volt lower than the rectified energizing voltage, and is not sufficient to bias transistor 133 into conduction. As long as either rectifier 107 or 108 is off, current may flow from the fully rectified power source through the indicator lamp 36 paralleled by resistor 119 or indicator lamp 37 paralleled by resistor 121, through either diode 128 or 129 and through resistor 131 to ground. This full cycle conduction keeps the junction of diodes 128, 129 and resistor 131 at only a fraction of a volt below the 12.6 volt rectified wave. Resistor 141 ties this point to the capacitor 139. If there is a time when diodes 128 and 129 both do not conduct, then resistor 141 is effectively connected to ground through resistor 131, and the current flowing through these two resistors in series will charge the capacitor 139 down below the 12.5 volt rectified source. If the downward trend continues below about 1.6 volts, sufficient base current will be delivered to transistor 133 by means of the resistor 138 to turn on rectifier 134, for a stop condition. The time constants of the charging resistors and capacitor 139 are adjusted to cause this voltage to be reached if current flows in capacitor 139 for more than 4 half wave cycles, that is, for more than 33⅓ milli-seconds.

Diode 128 does not conduct when rectifier 107 is on; diode 129 does not conduct when rectifier 108 is on. The firing angle of rectifier 108 is fixed since whenever it is on, it is for the last 135° of its cycle. Rectifier 107 has a variable firing angle, from the last 80° of a cycle to the last 152° of a cycle. Therefore the condition in which both diodes 128 and 129 are non-conducting can exist only for the last 80° to 135° of its cycle.

The waveforms for the anode voltages of rectifiers 107 and 108, the voltage at the junction of diodes 128, 129 and resistor 131, and the capacitor voltage of capacitor 139 are shown in FIGURES 5A to 5D inclusive, under conditions of increasing amplifier output voltage from the left side of the curve to the right side. FIGURE 5A represents the anode voltage of rectifier 108; FIGURE 5B represents the anode voltage of rectifier 107; FIGURE 5C represents the voltage waveform at the junction of diodes 128, 129 and resistor 131, and FIGURE 5D represents the capacitor voltage at capacitor 139 under these various conditions.

When rectifier 134 turns on, its cathode rises in voltage to within about 1 volt of the anode which is connected to the 12.6 volt fully rectified source. This supplies output voltage and current to the load 44, to the indicator lamp 48, and to the voltage divider consisting of resistors 148 and 149. To avoid reverse current from the gate of rectifier 134 to the collector of transistor 133, a diode 137 is inserted between the two. Diode 153 is connected in reverse direction across the load, and conducts only when an inductive load is present. Thus a high reverse voltage transient which might occur when an attempt is made to stop current flowing in the inductive load is prevented by the conduction of diode 153, thereby preventing damage to the output rectifier 134.

The holding voltage circuit contains resistors 147, 148 and 149 together with diodes 146 and 152, and capacitor 151. Once a "stop" condition is reached, it is desirable to hold that condition for a period of time to allow sufficient actuation time for mechanical devices such as solenoids or relays which respond to the output voltage, and to hold the indicator lights 34, 36 and 37 on to indicate to the operator whether the stoppage was caused by a multiple sheet condition or the absence of a sheet.

Diode 152 receives about 30% of the output voltage, and charges capacitor 151 up to about 5 volts at the peak of the cycle. When the energizing voltage begins to fall below about 5 volts between crests, the diode 146 begins to conduct forwardly, supplying current into the energizing line. The voltage of the 12.6 volt source then does not fall to zero every 180°, and all silicon controlled rectifiers which were conducting remain conducting for the full 180°. This is illustrated in FIGURE 6 of the drawings which depict the conditions existing at "stop," FIGURE 6A illustrating the anode voltage at rectifier 105, FIGURES 6B illustrating the collector voltage at transistor 133, FIGURE 6C illustrating the output voltage at the cathode of transistor 134, and FIGURE 6D illustrating the hold voltage appearing across capacitor 151.

The collector voltage of transistor 133 normally rests at 0.8 volt, which is not sufficient to overcome the forward voltage drop of diode 137 with enough voltage left to fire the output rectifier 134. A small step occurs in the collector voltage at the transistor 133 when the transistor 133 goes on. The small disturbance shown at the minimum points of the collector waveform are due to the cathode of rectifier 134 falling to zero volts between crests. The gate then begins to draw more current from the collector of transistor 133 through diode 137 and loads down the voltage. This current flowing into the gate assures that the rectifier 134 will fire immediately (at zero degrees) on the next voltage wave.

Closing the reset button 156 rapidly discharges the hold voltage on capacitor 151 through resistance 147, thereby allowing the rectifiers 106, 107 and 108 to return to the condition called for by the amplifier output voltage. Operating reset button 156 does not necessarily remove the output voltage because condition "B" or "D" may still exist, keeping the transistor 133 on and firing rectifier 134. The operator must correct the condition before pushing the reset button will permit feeding of more material.

When the hold voltage is on, and only the rectifier 106 is fired, causing the indicator light 34 to go on, the gates of rectifiers 107 and 108 are biased negatively so that no value of amplifier output voltage can fire these two rectifiers until the circuit is reset. However, if the hold voltage is on, and only rectifier 108 is fired, turning on indicator lamp 37, then rectifier 107 can be fired by raising the amplifier voltage and rectifier 108 will still remain on. Further increase of voltage will fire rectifier 106 and all three indicator lights, 34, 36 and 37 will be on.

The normal operation of the multiple sheet detector on a printing device involves first roughly setting the sensitivity control 74 to the type of stock being fed. A sheet or piece of a sheet of the material is laid over the sensor so that the light must pass through one thickness to reach phototransistor 51. The operator then adjusts the sensitivity control 74 to obtain a mid-scale reading on the meter 110. The operator then starts the feed control on the printing device to begin feeding material. In normal operation, indicator light 36 will light as the sheet passes by the sensor, and indicator light 37 will light after the sheet has gone by. The meter 110 will indicate about 1/10 of full scale with no sheet present, swing up to a peak reading of about 0.6 when the sheet goes by, and return to 0.1 between sheets. If a stop condition occurs with indicator lamps 36 and 37 lit, the operator may make an immediate correction to the sensitivity control 74 without checking for the presence of a double sheet because a condition "B" stoppage would not be caused by feeding more than one sheet. A stop condition with lamp 34 lit signifies that either more than one sheet has passed by or that the sensitivity control 74 was improperly set. The operator first checks to see if a double feed occurred, and if it did, he removes the faulty sheet, pushes the reset button 156 and then proceeds normally. If no misfeed is found, and there is no mechanical interference with the light path, he turns sensitivity control 74 and proceeds with normal feeding after resetting.

In the schematic illustration of FIGURE 1, the output of the motor control circuit 44 is shown as controlling the operation of the motor 10. This, of course, is purely schematic as the control signals derived from the circuits of the present invention can be used to perform other functions than controlling the prime mover. For example, they can be used to operate a reject mechanism such as a deflector whenever a misfeed is detected.

Various elements of the described circuits have use apart from an application of multiple sheet detectors. For example, the sensor circuit can be used in other photoelectric control and gaging systems where reasonably linear characteristics are desirable which are a function of the logarithm of the incident light and are easily adjustable in sensitivity and slope by a single control.

The discriminator circuit also has applications beyond the one specifically recited in this description. Any measured quantity which can be represented by a varying voltage within a certain range can be fed into the discriminator input, and the signals appearing on the silicon controlled rectifier anodes can be used directly to energize relays or can be digitally combined with diodes to cause logical control functions. The circuitry allows the transitions to be very sharp, with little hysteresis effect occurring when crossing a transition with increasing or decreasing voltage.

It should be evident that various modifications can be made to the described embodiments without departing from the scope of the present invention.

I claim as my invention:

1. In a system for measuring the thickness of sheet material, a radiant energy detector, a radiant energy source for transmitting an energy susceptible to substantial attenuation when passing through the sheet material and for transmitting said radiant energy through the sheet material to said detector means for feeding in succession individual sheets of the sheet material between said detector and said source, means for developing a first output signal proportional to the radiant energy impinged on said detector, and discriminator means responsive to said first output signal for respectively developing second, third and fourth output signals when the radiant energy impinged on said detector is above a certain value, within predetermined limits and outside predetermined limits.

2. In a system for measuring the thickness of sheet material, a phototransistor, an infrared light source for transmitting infrared energy through the sheet material to said phototransistor, an amplifying transistor having an input directly coupled to said phototransistor for developing a D.C. output signal corresponding to the intensity of infrared energy impinged on said phototransistor, a thermistor in circuit with said phototransistor for making said D.C. output signal substantially independent of ambient temperature changes, and output means responsive to said D.C. output signal for indicating the thickness of the sheet material.

3. In a system for measuring the thickness of sheet material, a phototransistor, an infrared light source for transmitting infrared energy through the sheet material to said phototransistor, circuit means including said phototransistor for developing a D.C. output signal corresponding to the infrared energy impinged on said phototransistor, adjustable bias means coupled to said phototransistor for obtaining a maximum change in said output signal in response to variations in the thickness of the sheet material in a certain range, and output means responsive to said D.C. output signal for indicating the thickness of the sheet material.

4. In a system for measuring the thickness of sheet material, a radiant energy detector, a radiant energy source for transmitting an energy susceptible to substantial attenuation when passing through the sheet material and for transmitting said radiant energy through the sheet material to said detector, means for developing a first output signal inversely proportional to the intensity of the radiant energy impinged on said detector, and discriminator means responsive to said first output signal for developing a second output signal when the radiant energy impinged on said detector is below a certain value, said discriminator means comprising a controlled rectifier having a control electrode, and means for applying said first output signal to said control electrode to render said controlled rectifier conductive when said first output signal exceeds a certain value.

5. In a system for measuring the thickness of sheet material, a radiant energy detector, a radiant energy source for transmitting an energy susceptible to substantial attenuation when passing through the sheet material and for transmitting said radiant energy through the sheet material to said detector, means for developing a first output signal proportional to the radiant energy impinged on said detector, and discriminator means responsive to said first output signal for developing second and third output signals corresponding to the levels of radiant energy impinged on said detector, said discriminator means comprising first and second controlled rectifiers having control electrodes, and means applying said first output voltage to said control electrodes to render said first controlled rectifier conductive when said first output signal exceeds a first value and said second controlled rectifier conductive when said first output signal exceeds a second value greater than said first value.

6. In a system for measuring the thickness of sheet material, a radiant energy detector, a radiant energy source for transmitting an energy susceptible to substantial attenuation when passing through the sheet material and for transmitting said radiant energy through the sheet material to said detector, means for developing a first output signal proportional to the radiant energy impinged on said detector, and discriminator means responsive to said first output signal for developing second and third output signals corresponding to the levels of radiant energy impinged on said detector, said discriminator means comprising first, second and third controlled rectifiers having control electrodes and means applying said first output voltage to said control electrodes to render said first controlled rectifier conductive when said first output signal is less than a first value, said second controlled rectifier conductive when said first output signal exceeds said first value and said third controlled rectifier conductive when said first output signal exceeds a second value greater than said first value, and logic circuit means connected to said controlled rectifiers for developing said second and third output signals.

7. In a system for measuring the thickness of sheet material, a radiant energy detector, a radiant energy source for transmitting an energy susceptible to substantial attenuation when passing through the sheet material and for transmitting said radiant energy through the sheet material to said detector, means for developing a first output signal proportional to the radiant energy impinged on said detector, and discriminator means responsive to said first output signal for developing second and third output signals corresponding to the levels of radiant energy impinged on said detector, said discriminator means comprising first and second controlled rectifiers having control electrodes, means applying said first output voltage to said control electrodes to render said first controlled rectifier conductive when said first output signal exceeds a first value and said second controlled rectifier conductive when said first output signal exceeds a second value greater than said first value, and means coupling said second controlled rectifier to said control electrode of said first controlled rectifier to prevent conduction of said first controlled rectifier when said second controlled rectifier is conducting.

8. In a multiple sheet detector system for detecting the presence of a plurality of sheets of a certain thickness and composition in sheet material, a radiant energy detector, a radiant energy source for transmitting an energy susceptible to substantial attenuation when passing through the sheet material and for transmitting said radiant energy through the sheet material to said detector, means for developing a first output signal proportional to the radiant energy impinged on said detector, and discriminator means responsive to said first output signal for developing a second output signal when said radiant energy is less than a value corresponding to the presence of no sheets but greater than a value corresponding to one sheet and when said radiant energy is less than a value corresponding to the presence of one sheet, said discriminator means including means for developing control signals at certain levels of the radiant energy impinged on said detector, and logic circuit means responsive to said control signals for developing said second output signal.

References Cited by the Examiner

UNITED STATES PATENTS

| | | | |
|---|---|---|---|
| 2,957,081 | 10/1960 | Chapman | 250—83.3 X |
| 3,010,018 | 11/1961 | Ziffer | 250—83.3 |
| 3,043,956 | 7/1962 | Cohen | 250—83.3 |
| 3,105,625 | 10/1963 | Miserocchi et al. | 250—219 X |

RALPH G. NILSON, *Primary Examiner.*

ARCHIE R. BORCHELT, *Examiner.*